Jan. 7, 1936.  J. D. CHRISTIAN  2,027,149
ELECTRIC POWER UNIT
Original Filed May 2, 1932

INVENTOR.
Joseph D. Christian
BY Robert N. Eckhoff
ATTORNEY.

Patented Jan. 7, 1936

2,027,149

UNITED STATES PATENT OFFICE 2,027,149

ELECTRIC POWER UNIT

Joseph D. Christian, San Francisco, Calif.

Original application May 2, 1932, Serial No. 608,757. Divided and this application July 7, 1934, Serial No. 734,172

16 Claims. (Cl. 74—421)

This is a division of application Serial Number 608,757 and relates to a torque and load transmitter, particularly one for a high torque and a low speed electric power unit.

For many industrial purposes it is desirable that standard high speed electric motors be utilized because of their cheapness and availability. These motors are usually classed as 4-6 and 8 pole speeds. When a much slower speed is desired a special construction is necessary. Speed reducers and transmission devices have been utilized to adapt the speed and power available from standard motors to the particular requirements which would otherwise require a special motor.

It is one of the principal objects of the present invention to provide a construction in which an electric motor and a power transmission device are provided in a novel manner. In this connection, it is a feature of this invention, an extension and improvement on that disclosed in my Patent 1,860,703, that the size of the unit is reduced with the result that the unit can be readily utilized industrially under conditions where space is a material factor and exacting speeds are required. Electric motors and speed reducers have been heretofore assembled and coupled as individual units upon a separate base unit. In accordance with the present invention the unwieldiness and lack of compactness in such units have been obviated, a small compact unit being available, through certain novel features of construction.

A particular feature of the present invention is the provision of a power transmission unit wherein a prime mover and a change speed device are provided in a novel manner. Heretofore it has been the practice to mount the change speed device and the prime mover on a separate base. Industrially such units have not met with favor where space was a consideration. In accordance with this invention, I mount the prime mover on a speed change unit adapter and provide the base on the speed change unit and on the adapter. A device so constructed minimizes space requirements while possessing the additional advantage that the whole device can be placed where the prime mover had been designed to be received. Thus, the right speed can be secured without having to purchase a special prime mover. Also, the change speed unit includes means enabling the speed and torque furnished to be varied within limits so that flexibility in speed and power is secured.

A further object of the invention is to devise a novel construction of a motor and speed reducer by which the construction, operation and maintenance of both the units is simplified, facilitated and rendered more accessible.

Another feature of the invention is the provision of a power unit which can be modified to suit practically any industrial load without requiring any change other than a replacement of various of the gear means comprising the power unit.

The invention possesses other advantageous features and objects, some of which with the foregoing will be set forth at length in the following, where I have outlined the preferred form of the speed reducer construction of my invention. It is to be understood that the form depicted is only the preferred form of the invention and that other forms and modifications can be adopted within the scope of the appended claims.

Figure 1:
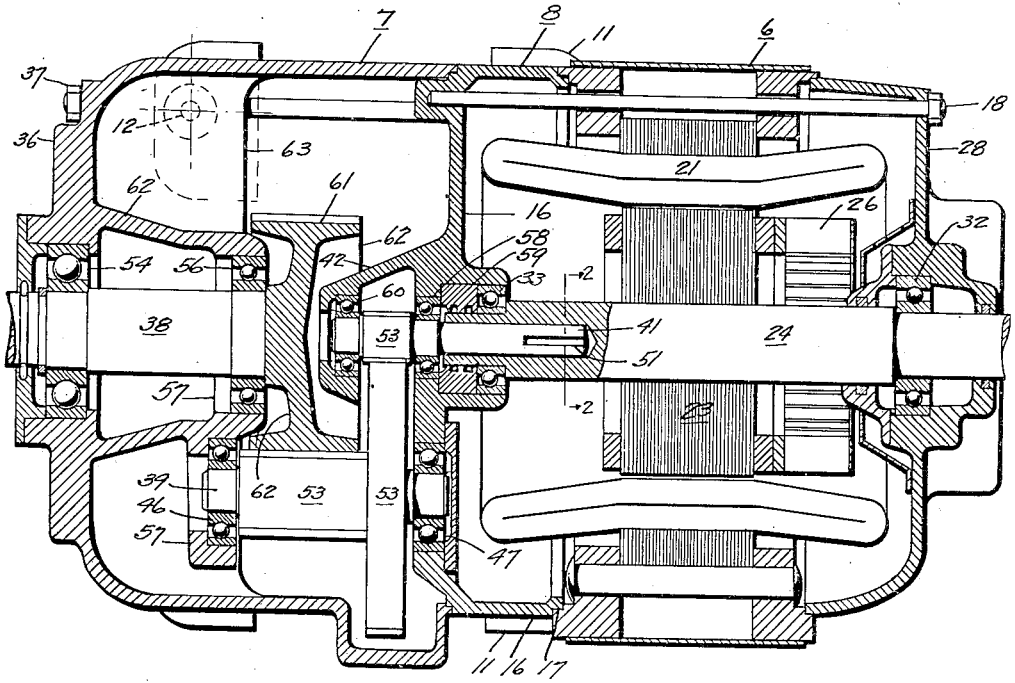
Figure 1 is a horizontal section through the torque and load transmitter.

My invention may be briefly characterized as comprising the combination of a motor unit and a speed change unit joined to provide a power unit having certain features and certain novel features of construction in the motor unit and in the speed reducer unit.

I provide a prime mover unit generally designated as 6 which is shown as an electric motor and a speed change unit generally designated at 7, in a casing or housing 8. The housing has several feet 11 in which holes 12 are provided so that the whole unit can be adjusted and secured with respect to a supporting surface in a desired position. These feet are conveniently provided in the same relationship to the housing as ordinarily exists between the base portion of a motor and the motor shaft so that the whole unit can be set in place upon a supporting surface in place of a standard motor. The base portion dimensions and shaft relationships in electric motors have been standardized so that a manufacturer can substitute any one of several motors in a unit if the supporting surface on the unit is according to the standards adopted for motor bases.

It is to be noted that the base or feet are provided only on the speed change unit and that the prime mover unit is mounted on the speed change unit and is supported by the base on the speed change unit. Thus, the reaction to the torque developed by the speed change unit acts through a shorter distance than when the base is provided under the motor and the change unit is installed on the motor, the reaction being entirely in the speed changer, which is suitably designed for such loads, rather than through the prime mover which is not ordinarily designed for high torque transmission.

In the construction illustrated in the drawing, casing or housing 8 is shown as including two portions, a first chambered portion in which the speed change unit is provided and a second chambered portion in which the motor unit is provided. These portions are on opposite sides of member 16, an adapter, extending transversely of the casing 8 to divide it off into separate and distinct chambers formed as will presently appear. Since the speed change unit ordinarily operates in the presence of a considerable quantity of lubricating medium, as oil, the plate and bearings provided in the member 16 are of such a nature that oil can not pass, to any appreciable extent, through to the motor.

The member 16 includes a grooved portion 17 adapted to cooperatively receive and engage a power unit 6 such as a standard electric motor. The motor is secured in the housing 8 by through bolts 18 which extend from end bell 28 through the motor to secure the motor in place on the change speed unit. If desired, member 16 can be extended, when undergoing manufacture, to provide the motor housing so that only the rotor and stator need be inserted in the housing.

Positioned between member 16 of the casing and end bell 28 is field winding or stator 21 of the electric motor. This stator or field winding 1 which can take any suitable form, depending upon the type of motor installed, is positioned so that a free air circulation through the motor can be maintained in any desirable manner. Cooperatively disposed with respect to the field winding or stator is a rotor 23, positioned for rotation upon a shaft 24 which generally extends coaxial with respect to the housing. The rotor can also take whatever form is desired, depending upon the particular type of electric motor desired. In the form shown in the drawing, the motor is of the induction type and the rotor 23 includes a plurality of fan blades 26 which are adapted upon rotation of the rotor to maintain a circulation of air through the motor so that it is cooled.

To facilitate the assembly of the motor unit and its subsequent inspection and maintenance, end bell 28 is secured to the casing by the bolts 18 to complete enclosure of the motor. Bearing 32 is provided in end bell 28 for supporting one end of the shaft 24 while an oil seal bearing 33 is provided for the opposite end of the shaft in the plate 16.

The assembly of the speed change unit is facilitated, as is the subsequent maintenance and inspection of this unit, by the provision of another end bell 36 adapted to be received by the member 16 to close the gear chamber. This end bell is secured by studs 37.

Positioned within end bell 36 are a driven shaft 38, a counter shaft 39 and a pintle shaft 41. These shafts are so arranged that the speed reducer or motion transmitting unit can be entirely removed without disturbing the motor upon removal of the end bell 36 by releasing the nuts on studs 37.

In the form of device shown in Figure 1, driven shaft 38 is mounted in a bearing 54 and end bell 36 and in a bearing 56 in transverse wall 57 of end bell 36. Bearings 46 and 47 for shaft 39 are mounted in wall 57 and plate 16, the bearings being much closed together so that shaft 39 is shorter and there is less opportunity for it to deflect.

Figure 2:
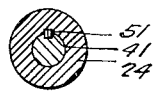
Figure 2 is a section on line 2—2.

Shaft 41 is splined or keyed to motor shaft 24, (Figure 2). This shaft is carried by bearings 58 and 60 provided in member 42 and plate 16. It is to be noted that shaft 38 includes a gear 61 forged, cut, and turned integrally therewith. The sides of gear 61 are dished as at 62 to accommodate member 42 and wall 57 so that shafts 38, 41, and 24 can be aligned and still provide the maximum bearing distance. Thus, bearings 54 and 56 are spaced apart so that torque of a maximum amount can be transmitted without the use of outboard bearings.

Bearings 58 and 60 support the pintle or stub shaft 41 independently of shaft 24 so that spline or key connection 51 has only to transmit rotational forces. A bearing retainer 59 is placed between bearings 58 and 33 and is grooved to prevent undue oil passage to bearing 33.

Transverse wall 57 forms one end of a cage 62 formed integrally with end bell 38. Bearings 54 and 56 are within the cage and are of the oil seal type so that leakage of lubricant is minimized. The cage is reinforced by webs 63 so that a rigid support for shaft 38 is secured.

Means, such as a plurality of herring bone or helical cut gears indicated at 53, are provided upon the counter and pintle shafts cooperatively with respect to each other and gears 61 so that a reduction or increase in the torque or speed available from the motor shaft is transmitted through to the driven shaft 38. These gears, as previously mentioned, are preferably of the herring bone, helical, or spiral type, since they are efficient and the noise attendant upon their operation is very small.

I claim:

1. In combination, a casing including a wall member and an end wall, a motor shaft on one side of said wall member, a stub shaft slidably connected to said motor shaft and extending on the other side of said wall member, a bearing for said stub shaft, said wall member including a portion extending from said wall member toward said end wall and supporting said bearing, a power take off shaft coaxial with said stub shaft, and a gear on an end of said take off shaft adjacent said extending casing member portion, said gear having a recessed face adjacent said extending portion to receive said portion.

2. In combination, a casing including a wall member and an end wall, a motor shaft on one side of said wall member, a stub shaft slidably connected to said motor shaft and extending on the other side of said wall member, a bearing for said stub shaft, said wall member including a portion extending from said wall member toward said end wall and supporting said bearing, a power take off shaft coaxial with said stub shaft, and a gear on an end of said take off shaft adjacent said extending casing member portion.

3. In combination, a casing including a wall member and an end wall, a motor shaft on one side of said wall member, a stub shaft slidably connected to said motor shaft and extending on the other side of said wall member, a counter shaft, a bearing for said counter shaft, said casing member including a portion extending from said wall member toward said end wall and supporting said bearing, a power take off shaft coaxial with said stub shaft, a bearing on an end of said take off shaft adjacent said extending casing member portion, said gear having a recessed face adjacent said extending portion to receive said portion, and power transmission means carried by said shafts.

4. In combination, a casing including first and second spaced wall members, a motor shaft on one side of said first wall member, a stub shaft slidably connected to said motor shaft and extending on the other side of said first wall member, a bearing for said stub shaft, said first wall member including a portion extending from said first wall member toward said second wall member and supporting said bearing, a power take off shaft coaxial with said stub shaft, said second wall member including a portion extending toward said first mentioned extending portion, bearing means carried by said second wall member and its extending portion to support said take off shaft, and a gear on an end of said take off shaft adjacent said extending first wall member portion, said gear having a recessed face adjacent said extending portion to receive said portion.

5. In combination, a casing including first and second spaced wall members, a motor shaft on one side of said first wall member, a stub shaft slidably connected to said motor shaft and extending on the other side of said first wall member, a bearing for said stub shaft, said first wall member including a portion extending from said first wall member toward said second wall member and supporting said bearing, a power take off shaft coaxial with said stub shaft, said second wall member including a portion extending toward said first mentioned extending portion, bearing means carried by said second wall member and its extending portion to support said take off shaft, and a gear on an end of said take off shaft adjacent said extending first wall member portion.

6. In combination, a casing including first and second spaced wall members, a motor shaft on one side of said first wall member, a stub shaft slidably connected to said motor shaft and extending on the other side of said first wall member, a bearing for said stub shaft, said first wall member including a portion extending from said first wall member toward said second wall member and supporting said bearing, a power take off shaft coaxial with said stub shaft, said second wall member including a portion extending toward said first mentioned extending portion, bearing means carried by said second wall member and its extending portion to support said take off shaft, a gear on an end of said shaft adjacent said extending first wall member portion, said gear having a recessed face adjacent said extending first wall member portion to receive said portion, a counter shaft, and power transmission means carried by said shafts.

7. In combination, a casing including first and second spaced wall members, a motor shaft on one side of said first wall member, a stub shaft slidably connected to said motor shaft and extending on the other side of said first wall member, a bearing for said stub shaft, said first wall member including a portion extending from said first wall member toward said second wall member and supporting said bearing, a power take off shaft coaxial with said stub shaft, said second wall member including a portion extending toward said first mentioned extending portion, bearing means carried by said second wall member and its extending portion to support said take off shaft, a gear on an end of said shaft adjacent said extending first wall member portion, a counter shaft, and power transmission means carried by said shafts.

8. In combination, a casing including first and second spaced wall member portions, a motor shaft on one side of said first wall member, a stub shaft slidably connected to said motor shaft and extending on the other side of said first wall member, a bearing for said stub shaft, said first wall member including a portion extending from said first wall member toward said second wall member and supporting said bearing, a power take-off shaft coaxial with said stub shaft, said second wall member including a portion extending toward said first mentioned extending portion, bearing means carried by said second wall member and its extending portion to support said take off shaft, a gear on an end of said take off shaft adjacent said extending first wall member portion, said gear having a recessed face adjacent said extending first wall member portion to receive said portion, a counter shaft, bearing means for said counter shaft in said first wall member and in said second wall member, and power transmission means carried by said shafts.

9. In combination, a casing including first and second spaced wall member portions, a motor shaft on one side of said first wall member, a stub shaft slidably connected to said motor shaft and extending on the other side of said first wall member, a bearing for said stub shaft, said first wall member including a portion extending from said first wall member toward said second wall member and supporting said bearing, a power take off shaft coaxial with said stub shaft, said second wall member including a portion extending, bearing means carried by said second wall member and its extending portion to support said take off shaft, a gear on an end of said take off shaft adjacent said extending first wall member portion, said gear having a recessed face adjacent said extending first wall member portion to receive said portion, a counter shaft, bearing means for said counter shaft in said first wall member and in said second wall member, and power transmission means carried by said shafts.

10. In combination, a casing having a wall and an end wall, an extension for supporting a bearing on each of said walls, and a shaft supported by a bearing in one of said walls and its extension and having a gear on an end thereof, said gear having its opposite faces recessed to receive each of said extensions.

11. In combination, two oppositely spaced parallel walls, each wall having a portion thereof extending toward the other wall, two pairs of bearings, one bearing being in each wall and portion thereof, and a shaft supported in each pair of bearings, one shaft having a gear on an end thereof recessed to admit said extending portions.

12. In combination, two oppositely spaced parallel walls, each wall having a portion thereof extending toward the other wall, two pairs of bearings, one bearing being in each wall and portion thereof, and a shaft supported in each pair of bearings, one shaft having a gear on an end thereof recessed to admit said extending portions and a counter shaft having gears thereon cooperating with gears on the other shafts.

13. In a geared motor the combination with a motor having a stator frame and rotor shaft, of a one-piece housing, an end closure for said housing releasably secured thereto and to said frame, a stub shaft arranged concentrically of said rotor shaft and having a separable driving connection therewith, spaced bearings for said shaft carried by said closure, a pinion on said shaft between said bearings, a power take-off shaft in said housing coaxially disposed with respect to said stub shaft, spaced bearings for said last named shaft, a gear on the rear end of said last named shaft hollowed out to accommodate one of said stub shaft bearings, and means including a countershaft journalled in said housing for transmitting power from said pinion to said gear.

14. The combination with a motor having a rotor shaft, of a gear set including a pinion shaft separably connected in driving relation with said rotor shaft, spaced bearings for supporting said pinion shaft independently of said rotor shaft to permit withdrawal of the latter without affecting said pinion shaft, a pinion on said pinion shaft between said bearings, a yoke structure embracing said pinion and supporting said bearings, a power take-off shaft aligned with said pinion shaft, a gear on the end of said last named shaft hollowed out to accommodate said yoke structure, and means including a countershaft for transmitting power from said pinion to said gear.

15. In a geared motor the combination with a motor having a stator frame and rotor shaft, a housing, means for releasably securing said housing to said frame, means for separating the interior of said housing from the interior of said frame, a bearing carried by said separating means for supporting the forward end of said rotor shaft, a stub shaft in said housing aligned with said rotor shaft, a separable driving connection between said rotor shaft and said stub shaft, spaced bearings carried by said separating means for supporting said stub shaft independently of said rotor shaft, a pinion on said stub shaft between said spaced bearings, a power take-off shaft journalled in said housing and projecting forwardly therefrom, and gearing in said housing for transmitting power from said pinion to said last named shaft.

16. The combination with a motor having a stator frame, and rotor shaft, of a gear set including a pinion shaft aligned with said rotor shaft, spaced bearings for supporting said pinion shaft independently of said rotor shaft, one end of one of said shafts being hollow to loosely receive the other shaft, a separable driving connection between said shafts, and means adjacent said rotor shaft and including a plurality of grooves forming a centrifugal oil seal effective to prevent travel of oil from said bearings to said motor.

JOSEPH D. CHRISTIAN.